(12) United States Patent
Takahashi et al.

(10) Patent No.: US 8,049,609 B2
(45) Date of Patent: Nov. 1, 2011

(54) IN-VEHICLE DISPLAY DEVICE

(75) Inventors: Nobuyuki Takahashi, Shizuoka (JP);
Kunimitsu Aoki, Shizuoka (JP);
Masahiro Takamatsu, Aichi (JP)

(73) Assignee: Yazaki Corporation, Tokyo (JP)

( * ) Notice: Subject to any disclaimer, the term of this patent is extended or adjusted under 35 U.S.C. 154(b) by 319 days.

(21) Appl. No.: 12/320,776

(22) Filed: Feb. 4, 2009

(65) Prior Publication Data
US 2009/0231116 A1 Sep. 17, 2009

(30) Foreign Application Priority Data

Mar. 12, 2008 (JP) ................................. 2008-062405

(51) Int. Cl.
| B60Q 1/00 | (2006.01) |
| G09G 5/00 | (2006.01) |
| G06K 9/00 | (2006.01) |
| G03B 21/56 | (2006.01) |

(52) U.S. Cl. ............ 340/461; 340/435; 340/436; 345/7; 382/103; 359/443; 362/459

(58) Field of Classification Search ................... 340/461, 340/435, 436; 345/7; 382/103; 359/443; 362/459
See application file for complete search history.

(56) References Cited

U.S. PATENT DOCUMENTS

| 5,519,536 | A | * | 5/1996 | Hoehn | ........................... 359/630 |
| 6,327,522 | B1 | * | 12/2001 | Kojima et al. | ..................... 701/1 |
| 6,727,807 | B2 | * | 4/2004 | Trajkovic et al. | ............. 340/436 |
| 7,605,773 | B2 | * | 10/2009 | Janssen | .............................. 345/7 |
| 2002/0049534 | A1 | * | 4/2002 | Yuda et al. | ..................... 701/209 |
| 2002/0097196 | A1 | | 7/2002 | Furuya et al. | |
| 2005/0099279 | A1 | * | 5/2005 | Forbes et al. | .................. 340/435 |
| 2007/0210906 | A1 | * | 9/2007 | Knoll et al. | ..................... 340/461 |

FOREIGN PATENT DOCUMENTS

| JP | 2002-019491 | 1/2002 |
| JP | 2003-291688 | 10/2003 |
| JP | 2004-130916 | 4/2004 |

* cited by examiner

*Primary Examiner* — Daniel Wu
*Assistant Examiner* — Emily C Terrell
(74) *Attorney, Agent, or Firm* — Edwards Angell Palmer & Dodge LLP

(57) ABSTRACT

An in-vehicle display device includes (a) a display unit provided on a surface of an instrument panel of a vehicle, opposed to a windshield of the vehicle, and configured to indicate a plurality of information dots V in a row or in a rectangular array on the windshield such that the necessary information dots are selectably displayed from among the plurality of the information dots and superposed upon a real image viewed through the windshield, (b) a target information acquisition unit that obtains target information of which a driver of the vehicle is to be notified, and (c) a display control unit that controls the display unit and makes the display unit indicate the predetermined information dots V that correspond to the target information that has been obtained by the target information acquisition unit.

4 Claims, 10 Drawing Sheets

IN-VEHICLE DISPLAY DEVICE

CROSS REFERENCE TO RELATED APPLICATION

The priority application Japanese Patent Application No. 2008-062405 upon which the present patent application is based is hereby incorporated by reference.

BACKGROUND OF THE INVENTION

1. Field of the Invention

The present invention generally relates to an in-vehicle display device, and more specifically to an in-vehicle display device that includes a display unit provided on a surface of an instrument panel of an automobile and configured to indicate one or more information dots on a windshield of the automobile.

2. Background of the Related Art

Recently, increasing number of various vehicles embrace a display device that incorporates techniques of projecting information directly into a human's field of vision, i.e., a head-up display (HUD) device. The display device of this kind helps improving driver's visibility. A virtual image presented by the display device is superposed on the landscape that can be seen ahead of the vehicle through a windshield of the automobile. The HUD devices of a kind as shown in Japanese Patent Application Laid-Open Publications No. 2002-211274 and No. 2004-130916 has a display unit as a main functional unit dedicated to virtual image display and a reflection member provided in an instrument panel of a vehicle, and light emitted by the display unit is reflected off the windshield or a combiner that protrudes from an upper surface of the instrument panel toward a driver, so that the driver recognizes what is presented within his or her field of vision during driving.

Also, since the driver in a driver's seat gets information mainly through visual perception, visual recognition is of essential importance for the driver. In addition, the driver can readily take a necessary action if the driver can at an earlier stage identify an obstacle that exists in a vehicle's traveling direction. In view of these factors, drive support systems with night-vision capability are advocated that ensures good visibility at night and in all weathers to support safe and careful driving.

A conventional drive support system with night-vision capability has various components including an infrared camera mounted on a front side of the vehicle body, a control unit (microcontroller or microprocessor), and the HUD device. Visual images captured for example by the infrared camera are presented by the HUD device, so that the driver can recognize an obstacle that exists in the vehicle's traveling direction.

A known in-vehicle display device that projects driving information on a windshield is disclosed by Japanese Patent Application Laid-Open Publication No. 2002-019491. The known device has an obstacle detecting unit that detects existence of the obstacle in the vehicle's traveling direction and a line-of-sight detecting unit that detects a direction of a line of sight of the driver. A display position of driving information relevant to the obstacle is moved toward a location of the obstacle and the driver's line of sight is guided toward the location of the obstacle. Also, in an HUD device disclosed in Japanese Patent Application Laid-Open Publication No. 2003-291688, if the obstacle that has been detected is a target object and the driver's line of sight is guided to the target obstacle when a distance between the vehicle and the obstacle becomes shorter than a threshold.

However, in the conventional HUD devices mentioned above, it is necessary to indicate a virtual image in a location relatively distant from the driver so as not to increase driver's burden of focusing his or her eyes on both the real image farther from the driver and the virtual image presented during driving, and one or more reflection members have to be provided to ensure that the virtual image is viewed by the driver at a predetermined distance. Accordingly, the HUD device has to incorporate expensive reflection members that cause a manufacturing cost of the HUD device as a whole to increase. In addition, mounting of the reflection member to the HUD device has to be done with utmost accuracy. Further, when the virtual images are to be projected using the conventional HUD device over a wide area of the windshield, as disclosed for example in the 2003-291688 document, a projector cannot be accommodated inside of the instrument panel, which is undesirable in terms of interior design of the automobile and appearance of a cockpit.

Furthermore, a sufficient space has to be provided inside of the instrument panel in order to accommodate the HUD device inside thereof in a manner that the accommodated HUD device does not interfere with the vehicle body and air-conditioning components.

Also, a size of the conventional virtual image and its display position on the windshield is limited so as not to interrupt a driver's range of vision while driving, and it is difficult for the driver to instantaneously recognize the virtual image while driving. Further, the drive support system with night-vision capability only allows a limited display area with a number of still and/or moving images to a detriment of driver's visibility.

SUMMARY OF THE INVENTION

In view of the above-identified drawbacks, the present invention is to provide an in-vehicle display device that can be readily provided on an instrument panel of an automobile with a reduced manufacturing cost.

In order to attain the above objective, the in-vehicle display device according to one embodiment of the present invention includes (a) a display unit that is provided on a surface of an instrument panel of a vehicle opposed to a windshield of the vehicle, and configured to selectably indicate a plurality of information dots in a row or in a rectangular array on the windshield such that the plurality of information dots are superposed on a real image in a traveling direction of the vehicle, (b) a target information acquisition unit configured to obtain target information that a driver of the vehicle is to be informed of; and (c) a display control unit that controls the display unit and makes the display unit indicate the information dot that corresponds to the target information obtained by the target information acquisition unit (refer to FIG. 1).

With the construction and arrangement described above, since the display control unit makes the display unit indicate the information dot or dots that correspond to the target information obtained by the target information acquisition unit, the in-vehicle display device of the present invention is capable of selectably indicating the necessary information dot or dots on the windshield from among the plurality of information dots. Accordingly, the necessary information dot or dots can be indicated at a desired region on the windshield in accordance with the target information.

Also, in contrast to conventional head-up display devices, the display unit can be integrally or separately provided on the surface of the instrument panel, and the display device does not need to be mounted with high accuracy and the instrument panel does not need to have a space dedicated to installation of the display device. Also, since only the necessary information dots are selectably indicated on the windshield, a distance between the display unit and the windshield can be reduced, an expensive reflection member does not need to be provided, and the display unit can directly project virtual images (the information dots) on the windshield. Also, even when the virtual images are indicated over a wide range of the windshield, degradation of driver's visibility can be avoided.

Further, by indicating the desired information dot or dots, the driver's attention and viewpoint can be directed toward the target information, and, at the same time, the driver can in an intuitive manner recognize the information dot or dots. Accordingly, the display device can be readily mounted on the instrument panel of the vehicle with reduced manufacturing cost.

Preferably, the display unit may be constituted by a plurality of point light sources arranged in a row or in a rectangular array over a range wider than a range of vision of the driver during driving, each point light source being configured to indicate one of the information dots, and the display control unit makes the point light sources indicate the information dot that corresponds to the target information unit (refer to FIG. 1).

With the construction and arrangement described above, the plurality of point light sources constituting the display unit of the in-vehicle display device are arranged in the row or in the rectangular array over the range wider than the driver's field of vision in the width direction of the vehicle body, and accordingly the information dots V corresponding to the target information can be selectably indicated over a wide range of the windshield 2.

Also, the information dots can be associated with a real image existing in the vehicle's traveling direction or the information dots can be superposed on the real image viewed through the windshield. Consequently, the driver's consciousness and viewpoint can be moved within the wide range on the windshield and the driver's driving can be effectively supported.

The in-vehicle display device according to one embodiment of the present invention preferably includes an obstacle detecting unit that detects an obstacle in the traveling direction of the vehicle. The target information acquisition unit obtains the target information indicative of a position of the obstacle detected by the obstacle detecting unit. The display control unit makes the display unit selectably indicate the information dot from among the plurality of information dots in accordance with the target information obtained by the target information acquisition unit such that the selected information dot is indicated near the obstacle or superposed on the obstacle on the windshield of the vehicle (refer to FIG. 1).

Accordingly, when the obstacle has been detected by the obstacle detecting unit 30 of the in-vehicle display device, the target information is obtained indicative of a location of the obstacle. On the basis of the obtained target information, the display control unit selects the information dots that are to be indicated near the real image of the obstacle on the windshield or to be superposed on the obstacle and the display unit indicates the information dots.

Since the information dot or dots that have been selected can be associated with or superposed on the real image of the detected obstacle and the information dot or dots are indicated on the windshield, the driver's attention and viewpoint can be moved toward the target obstacle by means of the presentation of the information dots and driver's safety driving can be effectively supported.

The in-vehicle display device preferably according to another embodiment of the present invention includes, in addition to the aforementioned construction, arrangement, and technical features of the present invention, an area-setting-information storage unit that stores area setting information used to enable or disable presentation of the information dot in a predetermined area of the windshield. The display control unit specifies a display area in which the information dot is to be indicated and makes the display unit indicate the information dot in the specified display area in accordance with the area setting information stored in the area-setting-information storage unit.

With the construction and arrangement described above, when the area setting information that enables indication of the information is stored in the area-setting-information storage unit, the display control unit specifies the display area in which the information dot is to be indicated, so that the information dots are only indicated that pertain to the specified display area.

Since it can be selected whether or not the information dot or dots are indicated in the display area, the information dots can be flexibly indicated depending upon the driver's preference and needs. Also, by making the display area or an area other than that correspond to the driver's range of vision is not interrupted by the information dots, so that the driver's visibility during driving can be improved.

BRIEF DESCRIPTION OF THE DRAWINGS

These and other objects, features, and advantages of the present invention will become more apparent upon reading of the following detailed description along with the accompanied drawings, in which.

DESCRIPTION OF THE PREFERRED EMBODIMENT

Figure 1:
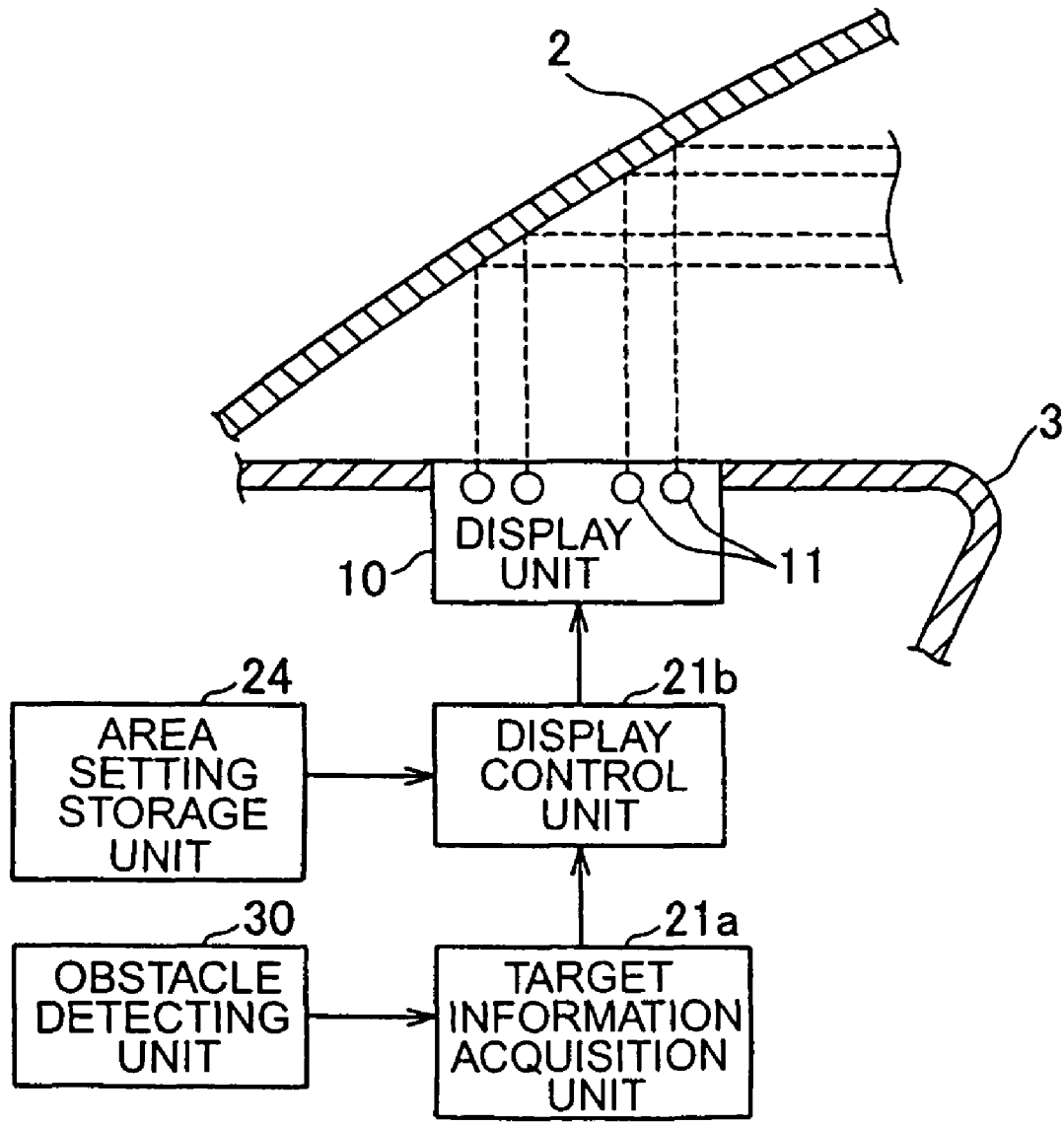
FIG. 1 schematically illustrates functional units incorporated in an in-vehicle display device according to one embodiment of the present invention.

Basic configuration of an in-vehicle display device that the present invention envisages is illustrated in FIG. 1.

An in-vehicle display device according to one embodiment of the present invention is described below with reference to FIGS. 2 to 9.

Figure 2:
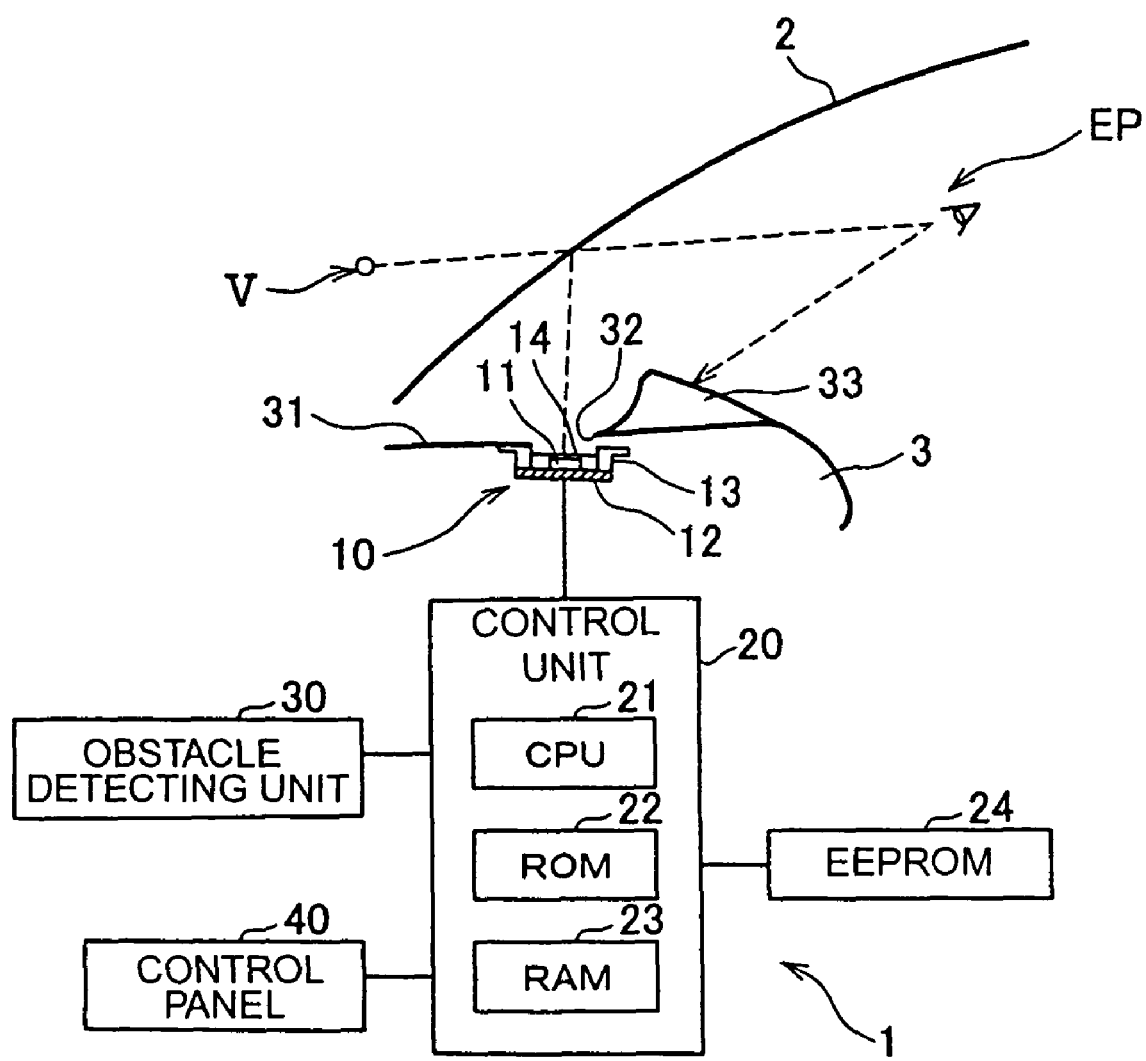
FIG. 2 is a system configuration of the in-vehicle display device illustrated in FIG. 1.

Referring to FIG. 2, the in-vehicle display device 1 has a display unit 10, a control unit 20, an obstacle detecting unit 30, and a control panel 40. The display unit 10, the obstacle detecting unit 30, and the control panel 40 are electrically connected to the control unit 20 via known interfaces (not shown).

Figure 3:
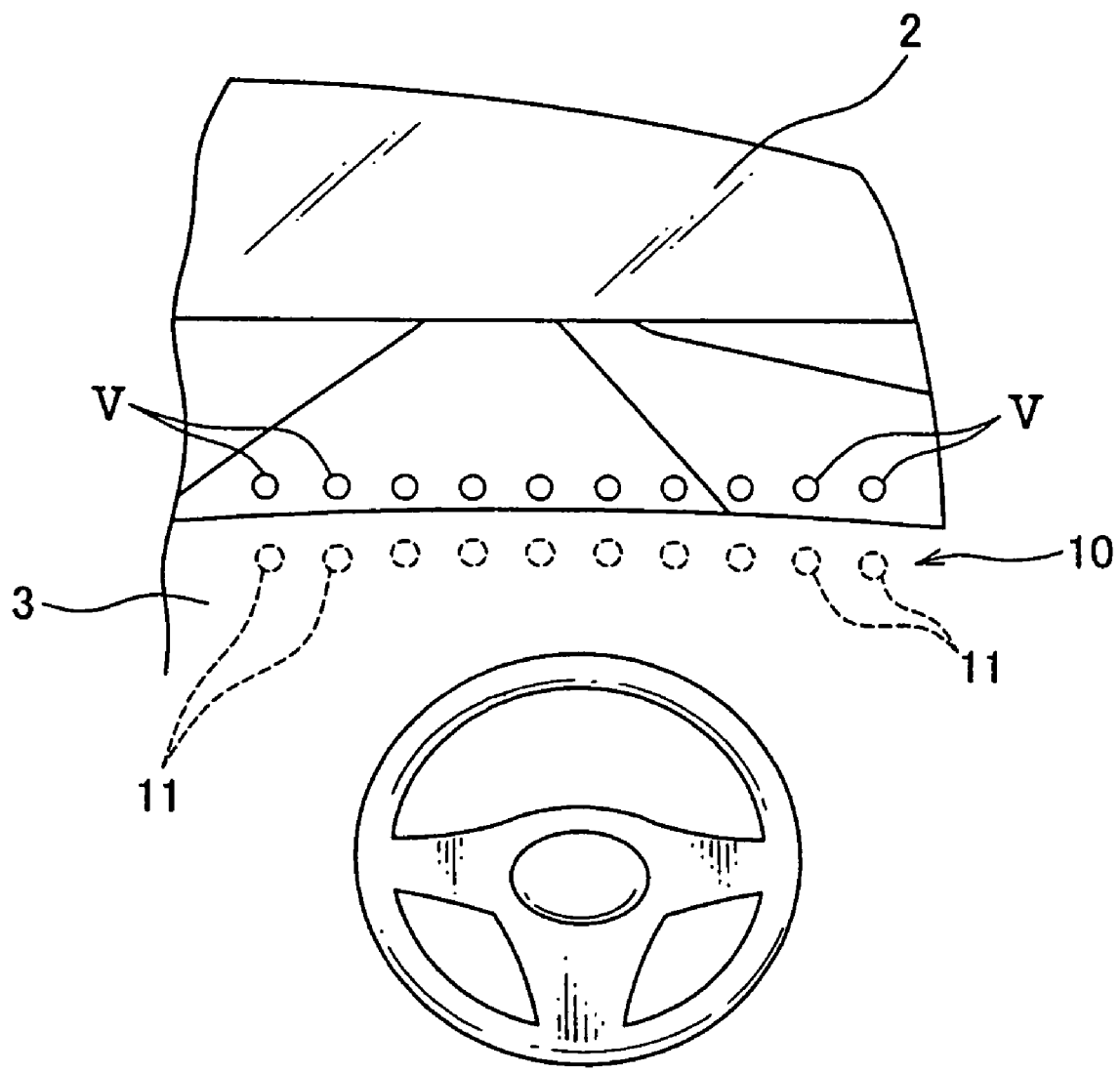
FIG. 3 illustrates a configuration of the display unit shown in FIG. 2.

The display unit 10 is provided on a surface 31 of an instrument panel 3 such that the display unit 10 is opposed to a windshield 2 of a vehicle. Referring to FIG. 3, the display unit 10 has a plurality of point light sources 11 (for example, an LED or a bulb). The point light sources 11 are provided on the instrument panel 3 and are arranged in a width direction of a vehicle body such that a plurality of information dots V are selectably displayed on the windshield 2 in a row extending in the width direction of the vehicle body and are superposed on a real image such as an obstacle ahead of the vehicle and a landscape in a direction of driving. Also, the plurality of point light sources 11 are arranged in view of for example a shape of a cross section of the windshield 2 in the width direction of the vehicle body such that the information dots V are viewed along a straight line extending in the width direction of the vehicle. Thus, arrangement of the plurality of point light sources 11 is adjusted in accordance with geometry of the windshield 2 and the instrument panel 3.

The plurality of point light sources 11 are mounted on a wiring board 12. The point light sources 11 are arranged at an opening 32 of the instrument panel 3 such that the point light sources 11 continue to the surface 31 of the instrument panel 3 when a case 13 that accommodates the wiring board 12 is attached to the instrument panel 3. Thus, the display unit 10 is incorporated in the surface 31 of the instrument panel 3 to constitute a single unit. The case 13 is covered by a cover 14 made for example of light-transmitting synthetic resin. The cover 14 is a non-reflecting member that does not reflect light such as an incoming light from an outside of the vehicle through the windshield 2.

Also, in the present embodiment, a shielding member 33 is provided that raises from a portion of the surface 31 of the instrument panel 3 upward toward the windshield 2 so as to reside between an eyepoint EP and the display unit 10. The shielding member 33 prevents the display unit 10 from being directly viewed from the driver's eyepoint EP.

Still referring to FIG. 2, the control unit 20 is a known microcontroller that has a central processing unit (CPU) 21, a read-only memory (ROM) unit) 22, and a readable/writable memory (RAM) unit 23. The ROM memory unit 22 stores programs that make the CPU 21 function as a target information acquisition unit 21a and a display control unit 21b as shown in FIG. 1. One of such programs is for display control operation which will be described later. The CPU 21 runs programs including the display control operation program stored in the ROM memory unit 22.

The RAM memory unit 23 stores data necessary for the CPU 21 to run the various programs.

An electrically erasable programmable read only memory (EEPROM) unit 24 is electrically connected to the control unit 20. The EEPROM memory unit 24 is used to store data that has to be retained even when not powered. The EEPROM memory unit 24 stores data such as display mode information and display area definition information. The display mode information determines whether information display is enabled or disabled. A display mode is specified by driver's turning on and off the display device 1 via the control panel 40.

The display area definition information includes may be used to associate (a) a display area within which the point light sources 11 can display the information dots V with (b) a display position of each point light source 11 in the display area. The display area definition information depends upon types and shapes of the windshield 2 and also vehicle types on which the in-vehicle display device 1 is provided.

The obstacle detecting unit 30 detects existence, a position, and a distance of an obstacle using for example a laser radar or an ultrasonic sensor, and outputs to the control unit 20 positioning data indicative of the detected position of the obstacle. It should be noted that the positioning data in the embodiment is data that indicates a relative position of the vehicle with respect to a target point. Also, the obstacle detecting unit 30 detects presence of a human body using for example a thermal infrared sensor, and a result of detection is output to the control unit 20 as human body detection data. In this embodiment, the control unit 20 obtains the position data and the human body detection data as "target information."

It should also be noted that the obstacle detecting unit 30 allows various modifications insofar as the obstacle can be duly detected. For example, by using two cameras such as charge-coupled device (CCD) cameras and video cameras, the image data captured by these cameras are output to the control unit 20, and, on the basis of the image data, the control unit 20 may recognize the obstacle through image processing. Other approaches are also possible.

The control panel 40 includes switches and buttons used to handle various settings of the in-vehicle display device 1, so that the driver can specify the settings. Also, the control panel 40 outputs to the control unit 20 a manipulate signal indicative of manipulation made by the driver.

Next, an example of display of the information dots V focusing on a pedestrian as the obstacle in front of the vehicle is described with reference to FIG. 4.

Figure 4:
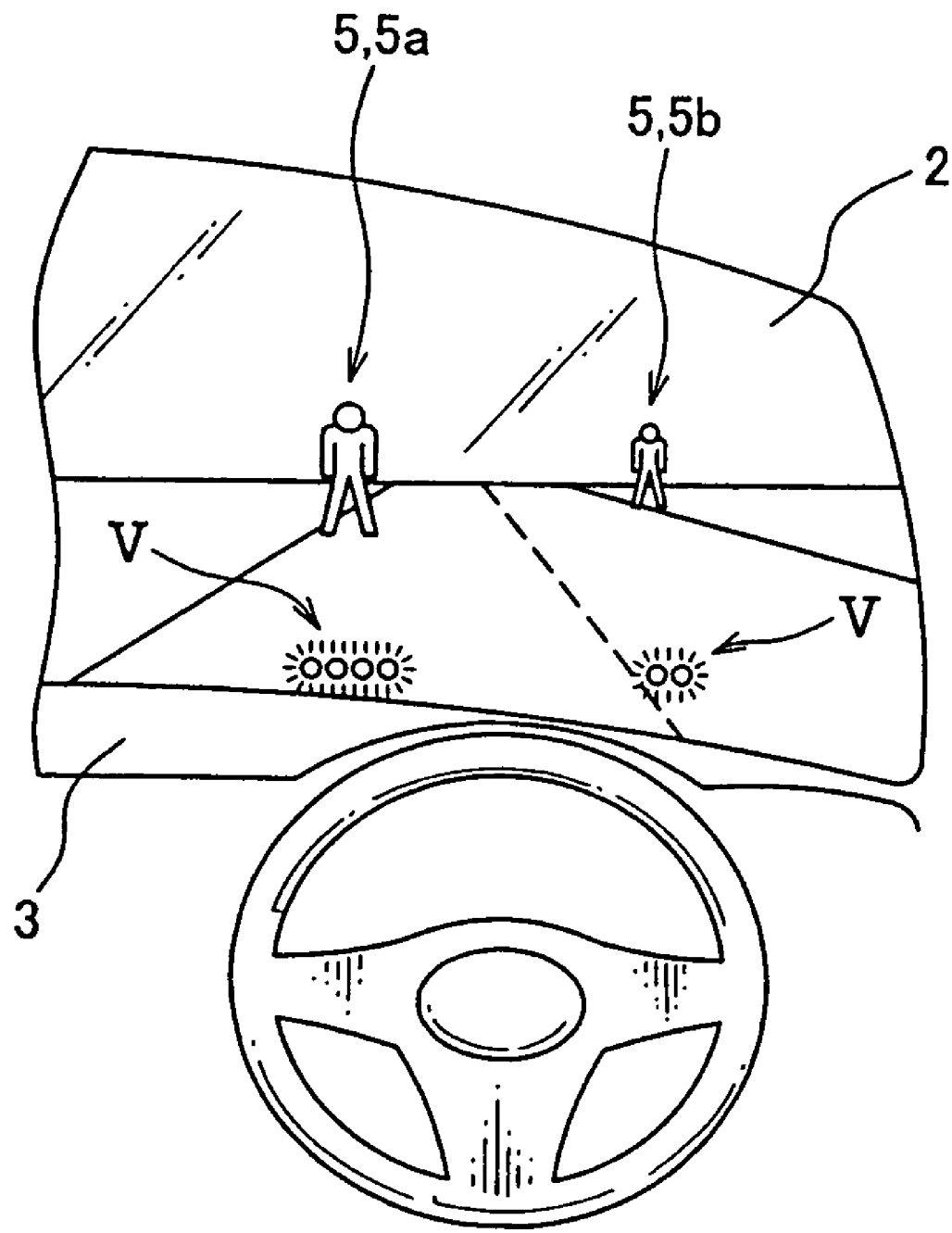
FIG. 4 is an example of information presented by the in-vehicle display device.

In the example shown in FIG. 4, when the plurality of information dots V should be indicated downward of the windshield 2 along a straight line close to the instrument panel, only the information dots V that corresponds to the obstacle 5 are indicated. If a distance between the vehicle and the obstacle 5 is small, the plurality (four in FIG. 4) of the information dots V are indicated. If the distance is relatively large, then fewer (two in FIG. 4) information dots V are indicated.

It should be noted that a constant number of the information dots V can be indicated in response to the detected obstacle 5 regardless of the distance between the vehicle and the obstacle 5, or the number of the information dots V to be indicated may vary depending upon types of the target information. Also, the mode of display of the information dots V may be specified by the driver. For example, when viewed from the driver's eyepoint EP, a shape of the information dot V can be such that the driver can recognize the dots V and yet the driver's range of vision in the vehicle's traveling direction is not interrupted by the information dots V. Also, the information dots V may be transparent.

Figure 5:
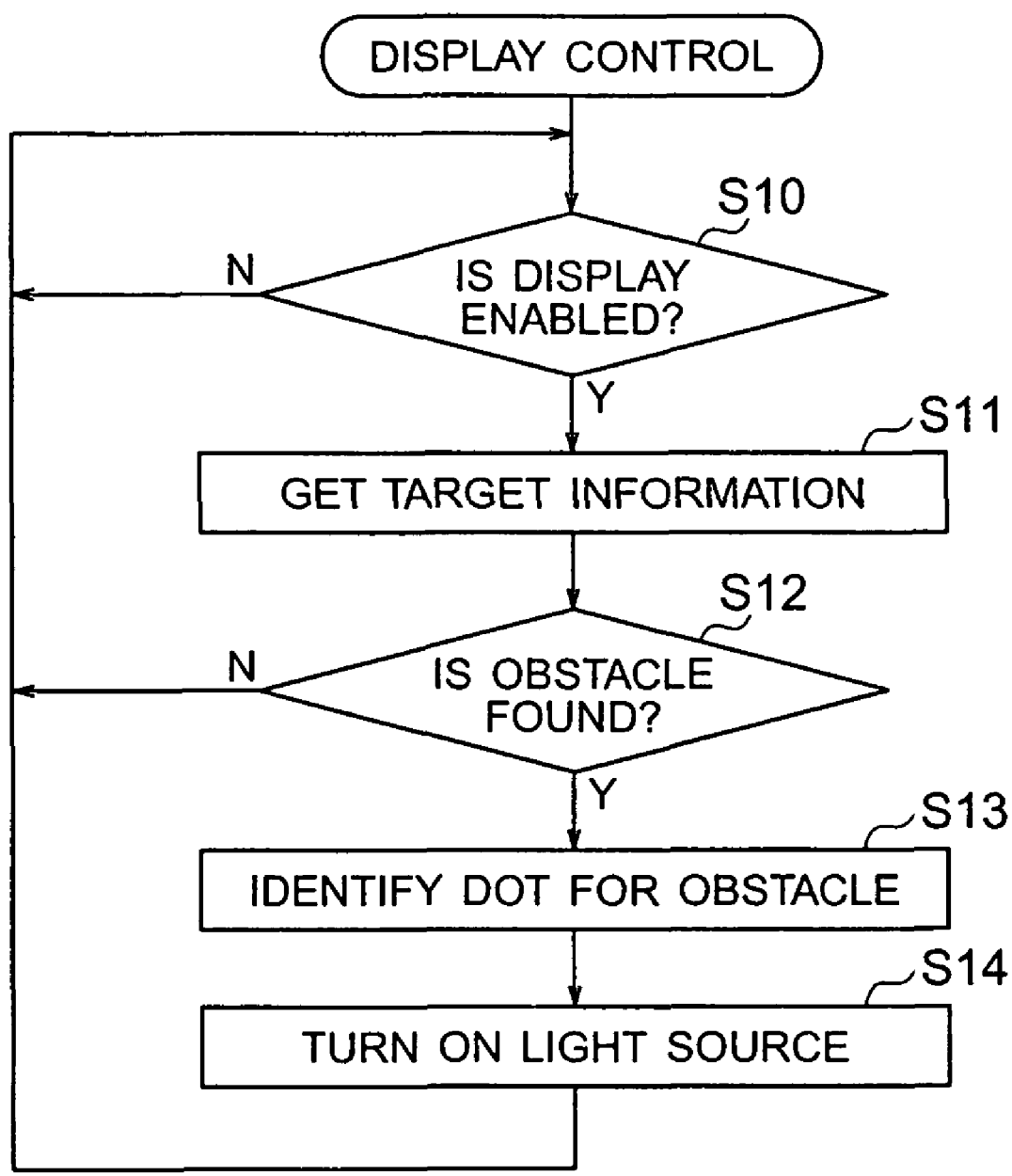
FIG. 5 is a flow chart of display control by the CPU shown in FIG. 2.

An example of the display control by the CPU 21 of the in-vehicle display device 1 is explained below with reference to a flow chart shown in FIG. 5. Note that the display control is forcibly terminated when the power is shut down or upon a termination request.

When the in-vehicle display device 1 is activated and the CPU 21 runs the display control operation program, it is judged whether a display functionality is set to an enabled mode or a disabled mode on the basis of the settings of the display mode information stored in the memory unit 24 (step S10). If the display functionality is disabled (when No in S10), the above judgment is repeated. If the display functionality is enabled (when Yes in S10), acquisition of the target information is attempted (step S11). If data on the existence, position, and distance of the obstacle is obtained by the obstacle detecting unit 30, the data is acquired as the target information and is stored in the memory unit 24 (step S11). The process goes to step S12.

On the basis of existence or absence of the data on the existence, position, and distance of the obstacle 5 contained in the target information stored in the memory unit 24, it is judged whether or not there is an obstacle 5 ahead of the vehicle in the traveling direction (step 12). If there is not the obstacle 5 found (when No in S12), the process goes back to the step S11, and a sequence of the previous steps will be repeated. If there exists the obstacle 5 (when Yes in S12), the operation goes to the step S13.

In step S13, on the basis of (a) the data on the position and distance of the obstacle 5 contained in the target information and (b) the display area definition information stored in the memory unit 24, a visually identified position of the obstacle 5 on the windshield 2 is estimated, the information dots V that correspond to the visually identified position are identified and stored in the RAM memory unit 23, and then the process goes to the step S14. It should be noted that, with regard to how to specify the information dots V, a definition table that corresponds to sizes and distances of the obstacle 5 may be pre-stored in the ROM memory unit 22 and a number and a position of the information dots V to be indicated may be specified on the basis of the definition table. Another possible approach would be to specify an area of the windshield 2 and then specify the information dots V that correspond to the specified windshield area. A person skilled in the art would readily perceive other derivative solutions.

In step S14, a request to enable the relevant point light sources 11 that corresponds to the information dots V identified by the RAM memory unit 23 and to disable other point light source 11 is sent to the display unit 10. The display unit 10 turns on the relevant point light sources 11 only. The information dots V are indicated at a region corresponding to the obstacle 5 viewed on the windshield 2. The process returns to the step S11, and the sequence of the steps is repeated.

As has been explained in the foregoing, the CPU 21 performs the display control, serving as the display control unit and the target information acquisition unit according to the preferred embodiment of the present invention.

An example mode of operation and effects of the in-vehicle display device 1 with the above-described configuration are explained below with reference to FIG. 4.

When the display mode information in the memory unit 24 is set to the enabled mode, the obstacle detecting unit 30 detects the obstacle 5 (for example, a pedestrian). Referring to FIG. 4, in a case where two pedestrians, i.e., a pedestrian 5a standing, walking, or traipsing on a traffic lane in which the vehicle is traveling and near the vehicle, and a pedestrian 5b standing, walking, or traipsing on an opposite traffic lane and farther from the vehicle are detected, four information dots V corresponding to the pedestrian 5a and the two information dots V corresponding to the pedestrian 5b are specified on the basis of the data on the position of the obstacle 5, and the point light sources 11 corresponding to the specified information dots V are turned on.

As a result, the lights emitted by the point light sources 11 are reflected off the windshield 2 of the vehicle toward the driver's eyepoint EP and thus four information dots V are indicated to the left side close to the instrument panel 3 and two information dots V are indicated to the right side spaced from the instrument panel 3. In this manner, the driver can move his or her line of sight to a windshield area above the indicated information dots V to recognize the approaching obstacle 5. Also, since the driver can recognize a degree of proximity to the obstacle 5 on the basis of the number of the information dots V indicated on the windshield 2, the driver can move his or her line of sight toward the obstacle 5 and/or a portion of the landscape that he or she must beware of.

The information dots relevant to the target information are selected from among the plurality of information dots V and indicated on the windshield 2. Accordingly, the display unit 10 can be provided on the surface of the instrument panel 3. The display device 1 is not bothered by a problems of minutely accurate mounting of the display device 1 and providing a sufficient space for accommodating the display device 1, which a conventional head-up display device would have to face. Also, since the information dots V are selectably indicated, the distance between the display unit 10 and the windshield 2 can be reduced, and the display unit 10 can directly project the information dots V on the windshield 2 without using a conventional costly reflection member. The display device 1 can be readily provided on the instrument panel 3 of the vehicle with reduced cost. Further, even when the information dots V are indicated over a wide range of the windshield 2, it is possible to avoid degradation of driver's visibility. Also, by indicating a desired information dots V, driver's consciousness and viewpoint are directed to the target information, and the driver can recognize the information dots in an intuitive manner.

Also, since the plurality of point light sources 11 constituting the display unit 10 are arranged in the row extending in the width direction of the vehicle body over a range wider than the driver's field of vision, the target information can be selectably indicated over a wide range of the windshield 2, and the indicated information dots V can be associated with the real image found ahead of the vehicle in its traveling direction. Accordingly, the driver can place his or her attention and viewpoint over the wide range of the windshield 2 and thus driver's driving can be effectively supported.

Further, since the information dots V can be associated with the real image of the detected obstacle 5 and the selected information dots V can be indicated on the windshield 2, the driver can move his or her attention and viewpoint toward the obstacle 5 by virtue of the information dots V, and thus driver's safe driving can be effectively supported.

It should be noted that, in the preferred embodiment, the obstacle 5 is defined as the target information for the in-vehicle display device 1. The present invention in no way excludes other various approaches. Various types of the target information other than the obstacle 5 (pedestrian) can be emphatically indicated.

Figure 6:
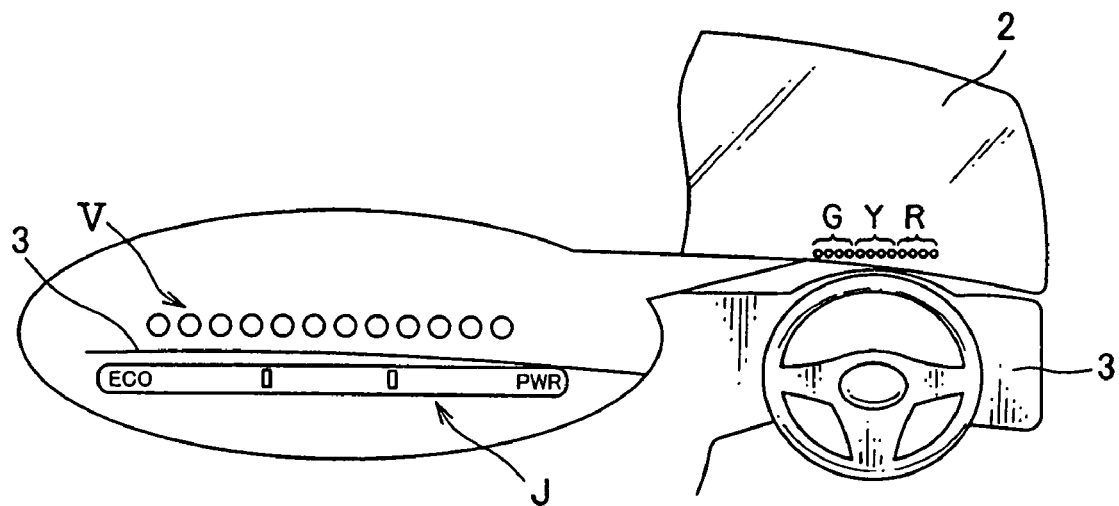
FIG. 6 is a second example of information presented by the in-vehicle display device illustrated in FIG. 1.

For example, as shown in FIG. 6, when vehicle's instantaneous fuel consumption is to be indicated, the in-vehicle display device 1 stores a threshold J used to judge the instantaneous fuel consumption in multiple stages (three stages in FIG. 6) and arranges the point light sources 11 with colors of green G, yellow Y, and red R from left to right in the vehicle's width direction. Information on the instantaneous fuel consumption including fuel injection time is acquired as the target information. The target information is compared with the threshold J, the information dots V with the display color corresponding to a result of the comparison are identified, and the point light sources 11 are indicated.

Figures 7A, 7B:
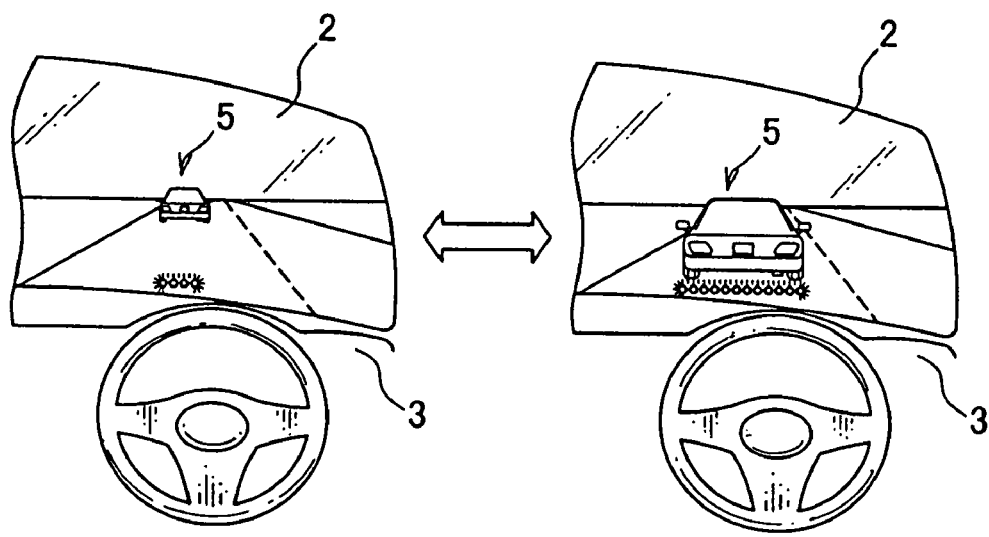
FIG. 7A is a third example of indication by the in-vehicle display device illustrated in FIG. 1.
FIG. 7B is the third example of indication by the in-vehicle display device illustrated in FIG. 1.

Also, as shown in FIG. 7, when the display device 1 serves as a functional support device for an adaptive cruise control (ACC) system, the display device 1 acquires data on the distance between the vehicle and the obstacle 5 found ahead of the vehicle, which could be an oncoming automobile, as the target information supplied from the obstacle detecting unit 30. As has been described in the embodiment, the information dots V corresponding to a width of the obstacle 5 are identified, and the corresponding point light sources 11 are indicated. Further, the in-vehicle display device 1 obtains image information used to discriminate a white line on a road and identifies a traffic lane in which the vehicle is traveling, and identifies the driving position of the vehicle in the traffic lane, identifies the information dots V corresponding to the driving position, and indicates the point light sources 11.

Figure 8:
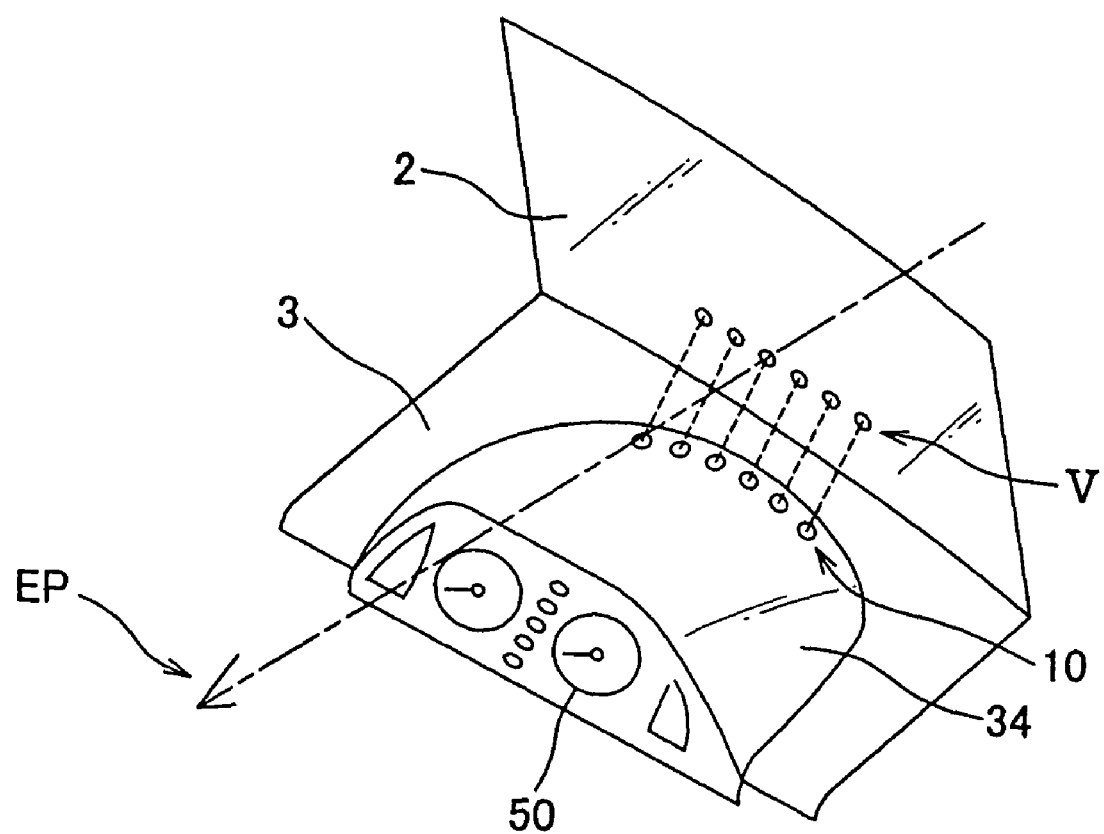
FIG. 8 is another configuration of the display unit shown in FIG. 2.

Further, in the preferred embodiment, as shown in FIG. 2, the shielding member 33 is provided on the instrument panel 3 so that the display unit 10 is not directly seen by the driver. However, as shown in FIG. 8, the display unit 10 may be provided on a sloping surface of the raised portion 34 of the instrument panel 3 with a meter 50 incorporated in the instrument panel 3. By providing the display unit 10 on the raised portion 34, shielding member 33 does not need to be provided on the instrument is panel 3, which allows flexibility in design of the instrument panel 3. As another alternative, the position of the point light sources 11 constituting the display unit 10 may be lowered to somewhere in the instrument panel 3 such that the point light source 11 cannot directly be seen by the driver.

Figure 9:
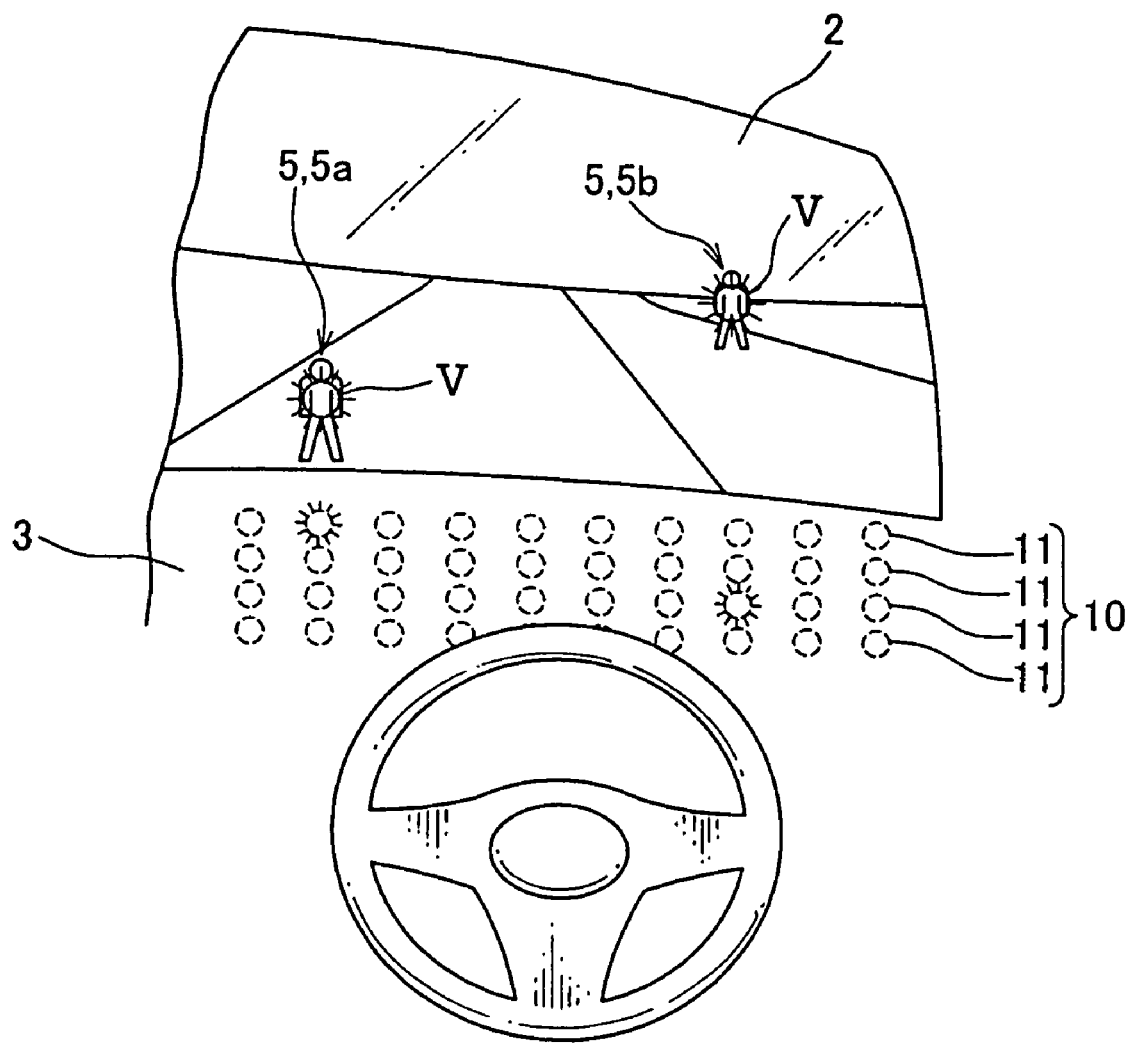
FIG. 9 illustrates an example of rectangular-array arrangement of point light sources constituting the display unit shown in FIG. 2.

Also, in the preferred embodiment, as shown in FIG. 3, the plurality of point light sources 11 are arranged in one row extending in the width direction of the vehicle body. The display device of the present invention does not exclude other forms of implementation. Referring to FIG. 9, the plurality of point light sources 11 may be arranged in a rectangular array i.e., a plurality (four in FIG. 9) of rows extending in the width direction of the vehicle body.

By constituting the display unit 10 by the point light sources 11 arranged in the rectangular array as shown in FIG. 9, the display device 1 is capable of indicating the information dots V when the pedestrians 5a and 5b have been identified such that the information dots V are superposed upon the real images of the pedestrians 5a and 5b, respectively. Also, the display device 1 can make the driver recognize with higher accuracy the locations of the pedestrians 5a and 5b with the information dots (four dots, for example) such that the pedestrians are each surrounded by the dots V, or superposing the plurality of information dots V upon the real images of the pedestrians 5a and 5b. Such a mode of display helps the driver estimate the position of the pedestrians 5a and 5b and a distance between the vehicle and the pedestrians 5a and 5b, and drive safely and carefully even when the visibility in the vehicle's traveling direction is not favorable.

In this embodiment, all the entire display area on the windshield 2 is used as the display area in which information can be presented by the is display unit 10. Of course, this is just one of the possible approaches that can be achieved by the display device 1 according to the preferred embodiment of this invention. For example, a component that detects the direction of the driver's line of sight, which is a known device disclosed for example in Japanese Patent Application Laid-Open Publication No. 2004-254960, can be incorporated in the in-vehicle display device 1 according to the preferred embodiment of the present invention and the information dots V may only be indicated in the driver's range of vision during driving out of the entire display area or indicated in an area that does not belong to the driver's range of vision for driving. This is one of the variations that may be conceived by a person skilled in the art. In this particular case, the memory unit 24 may store area setting information used to enable or disable the display functionality that indicates information dots V in a portion of the display area that corresponds to either the range of vision for driving or an out-of-the-range-of-vision area, and the area in which the information dots V are indicated can be specified as required on the basis of the area setting information.

Figure 10:
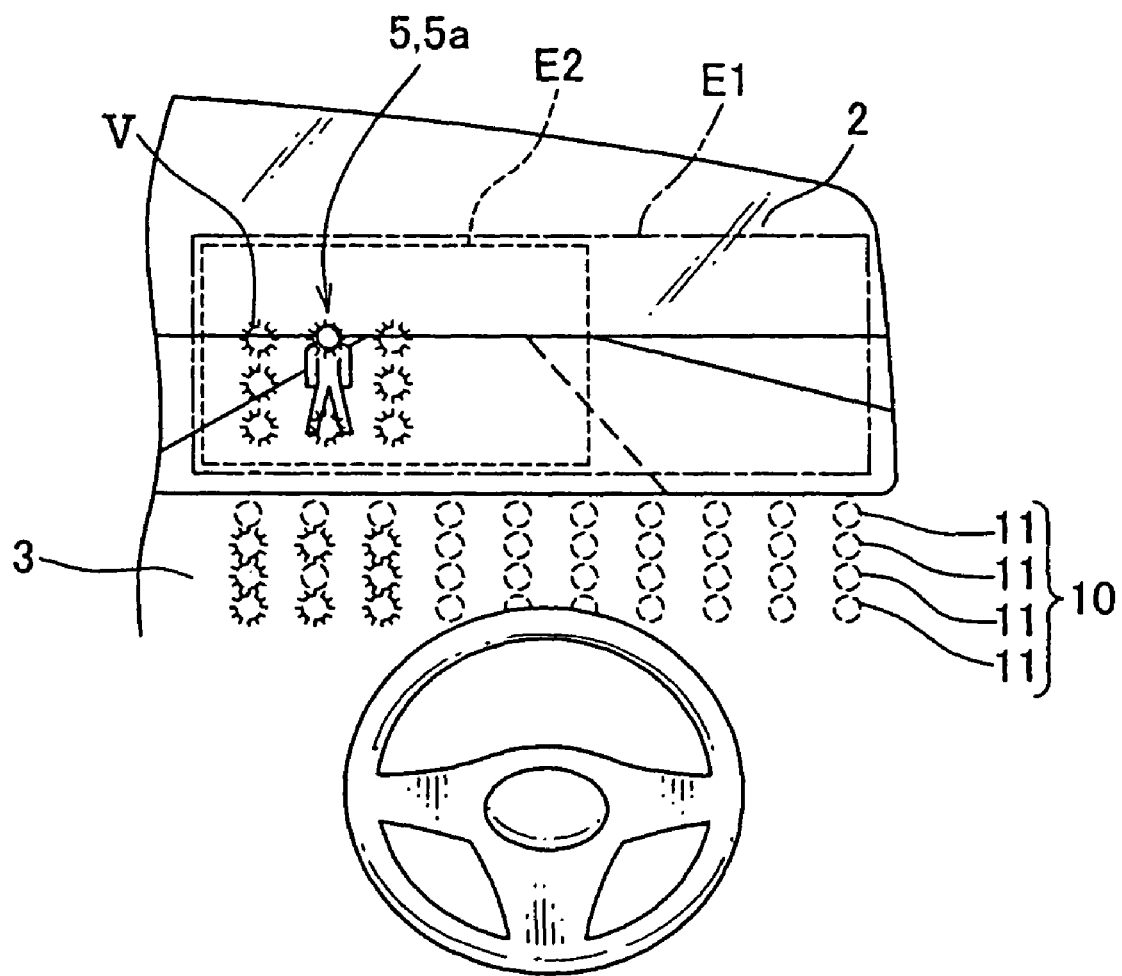
FIG. 10 illustrates an example of a display area in the in-vehicle display device according to another embodiment of the present invention.
Figure 11:
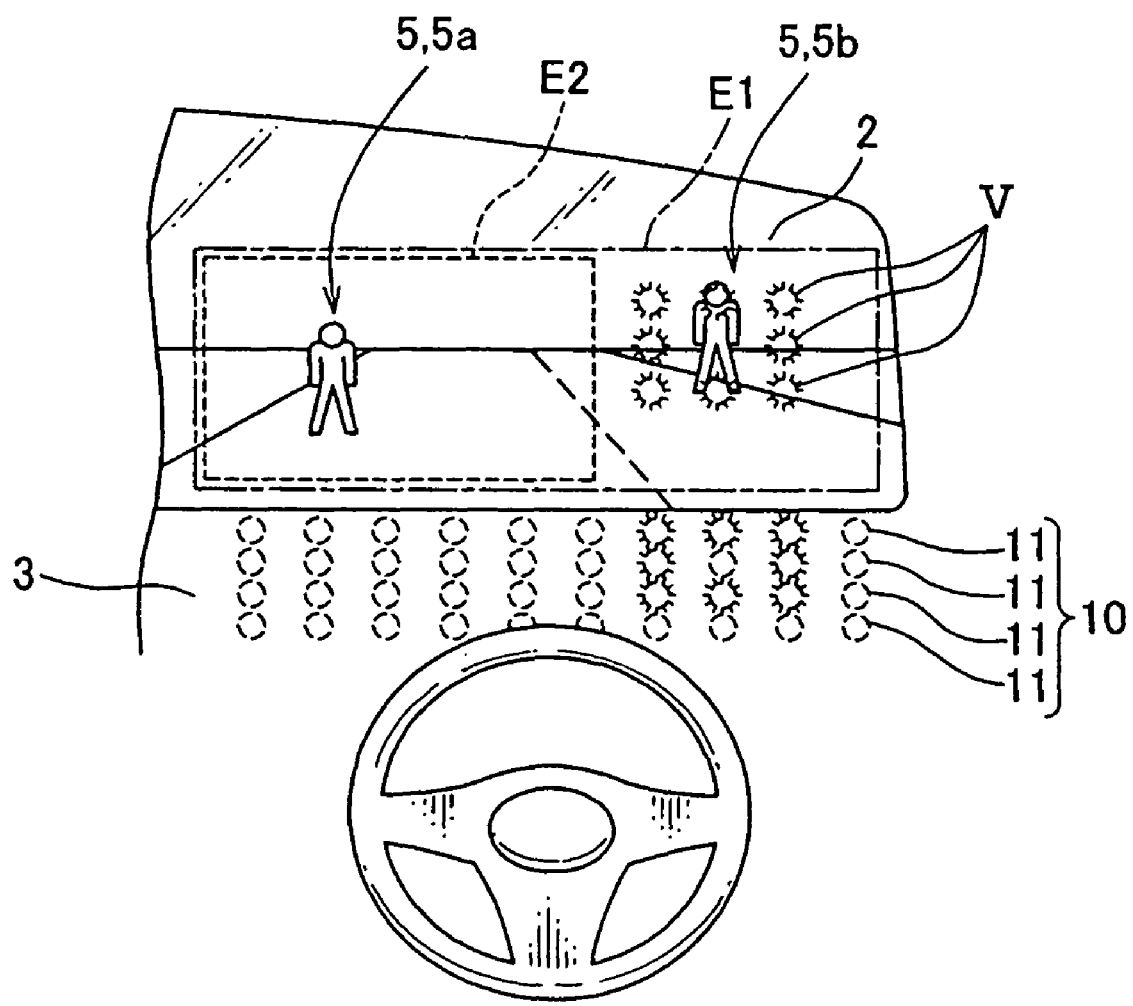
FIG. 11 illustrates an example of presentation of information in the display area illustrated in FIG. 10.

Also, as shown in FIG. 10 and FIG. 11, the in-vehicle display device 1 according to another embodiment of the present invention allows the driver to select the display area of the information dots V.

Referring to FIG. 10 and FIG. 11, a display area E1, which is specified by a display area definition information of the display device 1, is a region on the windshield 2 in which the plurality of point light sources 11 can project the information dots V. A display area E2 is a range of vision of the driver within the display area E1. Although the display area E2 is fixed for the sake of simplicity, the display area E2 may be movable in response to the driver's line of sight.

The memory unit 24 stores the area setting information that is used to enable or disable presentation of the information dots V on the predetermined display area E2 of the windshield 2. More specifically, the memory unit 24 serves as an area-setting-information storage unit. The ROM memory unit 22 stores an area-setting program that allows the area setting information to be specified by the driver via the control panel 40.

When both of the display area E1 and the display area E2 are enabled by the area setting information stored in the memory unit 24, the obstacle detecting unit 30 detects the obstacle 5 (i.e., the pedestrian 5a) residing within the display area E2, and the display device 1 makes the point light sources 11 that correspond to the eight information dots V on the basis of the positioning data such that the real image of the pedestrian 5a is surrounded by the information dots V.

When the display area E2 is disabled by the area setting information stored in the memory unit 24 and the obstacle detecting unit 30 detects the pedestrian 5a found near the vehicle and in the traffic lane in which the vehicle is traveling, and the pedestrian 5b found away from the vehicle and in the opposite traffic lane with respect to the vehicle, then the point light sources 11 that correspond to the eight information dots V are illumined on the basis of the positioning data corresponding to the pedestrian 5b. In this case, since the display area E2 is disabled, the information dots V are not indicated for the pedestrian 5a found in the display area E2.

Accordingly, the in-vehicle display device 1 can focus the driver's attentions on the farther pedestrian 5b who is otherwise difficult for the driver to recognize, by superposing the plurality of information dots V only upon the farther pedestrian 5b. Also, since the nearer pedestrian 5a is within the driver's range of vision, the information dots V do not need to be indicated for the nearer pedestrian 5a. Accordingly, presentation of the information dots V for the display area E2 may only be enabled at night and in a bad weather by the area setting information stored in the memory unit 24.

In this manner, the display area E2 in which the information dots V are indicated can be specified depending upon the area setting information and it can be selected whether or not the information dots V are indicated in the display area E2. The information dots V can be indicated according to driver's preference and needs. Also, since two areas, i.e., the display area E1 and the display area E2 that corresponds to the driver's range of vision are defined, the presentation of the information dots V does not interrupt the driver's range of vision and driver's visibility during driving can be improved.

Incidentally, if the point light sources 11 are simply projected upon (reflected off) the windshield 2, false dots may appear along with the actual information dots V for example due to a thickness of the windshield 2 and reflection on its outer surface. To avoid this, the information dots V may be indicated in one row constituting a band or a slip.

In addition, in the preferred embodiment, the display unit 10 is constituted by the plurality of point light sources 11. Alternatively, an organic electro luminescence (EL) display or a liquid crystal panel may be provided on the surface 31 of the instrument panel 3 over a range wider than the driver's range of vision so as to indicate the information dots V in one row or in the rectangular array, or any other arrangement that is not discussed in the embodiment.

Having now fully described the device according to the preferred embodiment of the present invention, it is clear that the foregoing is illustrative of the present invention and is not to be construed as limiting the invention. Those skilled in this art will readily effectuate possible modifications and variations without materially departing from the spirit and scope of the present invention.

What is claimed is:

1. An in-vehicle display device comprising:
    an obstacle detecting unit configured to detect an obstacle in a traveling direction of the vehicle;
    a display unit provided on a surface of an instrument panel of a vehicle, opposed to a windshield of the vehicle, and configured to selectably indicate a plurality of information dots in a row or in a rectangular array on the windshield such that the plurality of information dots are indicated near a real image of the obstacle or superposed on the real image of the obstacle on the windshield of the vehicle;
    a target information acquisition unit configured to obtain target information that a driver of the vehicle is to be informed of, the target information being indicative of a size, distance, and position of the obstacle detected by the obstacle detecting unit; and
    a display control unit configured to control the display unit and make the display unit selectably indicate at least one of the information dots that corresponds to the target information obtained by the target information acquisition unit, the number and position of the information dots indicated being determined in dependence upon size, distance, and position of the obstacle detected by the obstacle detecting unit.

2. The in-vehicle display device as set forth in claim 1, wherein the display unit includes a plurality of point light sources arranged in a row or in a rectangular array over a range wider than a range of vision of the driver during driving, each point light source being configured to indicate one of the information dots, and the display control unit makes the point light sources indicate the information dot that corresponds to the target information unit.

3. The in-vehicle display device as set forth in claim 1 further comprising an area-setting-information storage unit that stores area setting information used to enable or disable presentation of the information dot in a predetermined area of the windshield, wherein the display control unit specifies a display area in which the information dot is to be indicated and makes the display unit indicate the information dot in the specified display area in accordance with the area setting information stored in the area-setting-information storage unit.

4. The in-vehicle display device as set forth in claim 2 further comprising an area-setting-information storage unit that stores area setting information used to enable or disable presentation of the information dot in a predetermined area of the windshield, wherein the display control unit specifies a display area in which the information dot is to be indicated and makes the display unit indicate the information dot in the specified display area in accordance with the area setting information stored in the area-setting-information storage unit.

* * * * *